United States Patent
Kim et al.

(10) Patent No.: US 9,695,362 B1
(45) Date of Patent: Jul. 4, 2017

(54) COLOR DISPLAY DEVICES

(71) Applicant: ELECTRONICS AND TELECOMMUNICATIONS RESEARCH INSTITUTE, Daejeon (KR)

(72) Inventors: Gi Heon Kim, Daejeon (KR); Yong Hae Kim, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/213,026

(22) Filed: Jul. 18, 2016

(30) Foreign Application Priority Data

Jan. 22, 2016 (KR) ........................ 10-2016-0008215

(51) Int. Cl.
*G02F 1/1334* (2006.01)
*C09K 19/60* (2006.01)
(Continued)

(52) U.S. Cl.
CPC .......... *C09K 19/605* (2013.01); *C09K 19/544* (2013.01); *C09K 19/60* (2013.01);
(Continued)

(58) Field of Classification Search
CPC ............... G02F 1/1334; G02F 2202/04; G02F 2202/043; C09K 19/60; C09K 19/601; C09K 19/603; C09K 19/605
(Continued)

(56) References Cited

U.S. PATENT DOCUMENTS

| | | | | |
|---|---|---|---|---|
| 5,303,073 A | * | 4/1994 | Shirota | C09K 19/544 349/74 |
| 5,499,121 A | * | 3/1996 | Brewer | G02F 1/13725 349/165 |

(Continued)

FOREIGN PATENT DOCUMENTS

| | | |
|---|---|---|
| KR | 10-2007-0031507 A | 3/2007 |
| KR | 10-2010-0132309 A | 12/2010 |

(Continued)

OTHER PUBLICATIONS

H. Seki et al., "Colorimetric Property of Guest-Host Liquid Crystal Displays", ASID'99, 1999, pp. 347-350.
(Continued)

*Primary Examiner* — John A McPherson

(57) ABSTRACT

A color display device includes a plurality of pixels. Each of the pixels includes a first transparent electrode and a second transparent electrode, opposing to each other, a polymer layer between the first transparent electrode and the second transparent electrode, a first coloring material dispersed in the polymer layer, liquid crystals provided in the polymer layer, and a second coloring material dispersed in the liquid crystals. The first coloring material and the second coloring material presents different colors, and each of the first coloring material and the second coloring material includes at least one of a red coloring material, a green coloring material, a blue coloring material, a yellow coloring material, a cyan coloring material, and a magenta coloring material.

18 Claims, 9 Drawing Sheets

(51) Int. Cl.
*G02F 1/1335* (2006.01)
*G02F 1/1343* (2006.01)
*C09K 19/54* (2006.01)

(52) U.S. Cl.
CPC .......... *C09K 19/601* (2013.01); *C09K 19/603* (2013.01); *G02F 1/1334* (2013.01); *G02F 1/13439* (2013.01); *G02F 1/133504* (2013.01); *G02F 1/133553* (2013.01); *G02F 1/134309* (2013.01); *G02F 2202/022* (2013.01)

(58) Field of Classification Search
USPC .......................................................... 349/86
See application file for complete search history.

(56) References Cited

U.S. PATENT DOCUMENTS

| | | | | |
|---|---|---|---|---|
| 5,942,154 | A | * | 8/1999 | Kim ...................... C09K 19/544 252/299.01 |
| 2004/0189893 | A1 | * | 9/2004 | Choi ................. G02F 1/133514 349/86 |
| 2007/0268427 | A1 | * | 11/2007 | Uehara ................ G02B 6/0016 349/62 |
| 2010/0309413 | A1 | | 12/2010 | Jang et al. |
| 2011/0039032 | A1 | | 2/2011 | Jang et al. |
| 2011/0067807 | A1 | | 3/2011 | Hwang et al. |
| 2012/0038852 | A1 | | 2/2012 | Jang et al. |
| 2014/0002777 | A1 | | 1/2014 | Kim et al. |
| 2014/0168595 | A1 | | 6/2014 | Kim et al. |

FOREIGN PATENT DOCUMENTS

| | | |
|---|---|---|
| KR | 10-2011-0017724 A | 2/2011 |
| KR | 10-2011-0032639 A | 3/2011 |
| KR | 10-2012-0015190 A | 2/2012 |

OTHER PUBLICATIONS

Wen-Yu Teng et al., "Nanoparticles-doped guest-host liquid crystal displays", Optics Letters, Aug. 1, 2008, pp. 1663-1665, vol. 33, No. 15, Optical Society of America.

\* cited by examiner

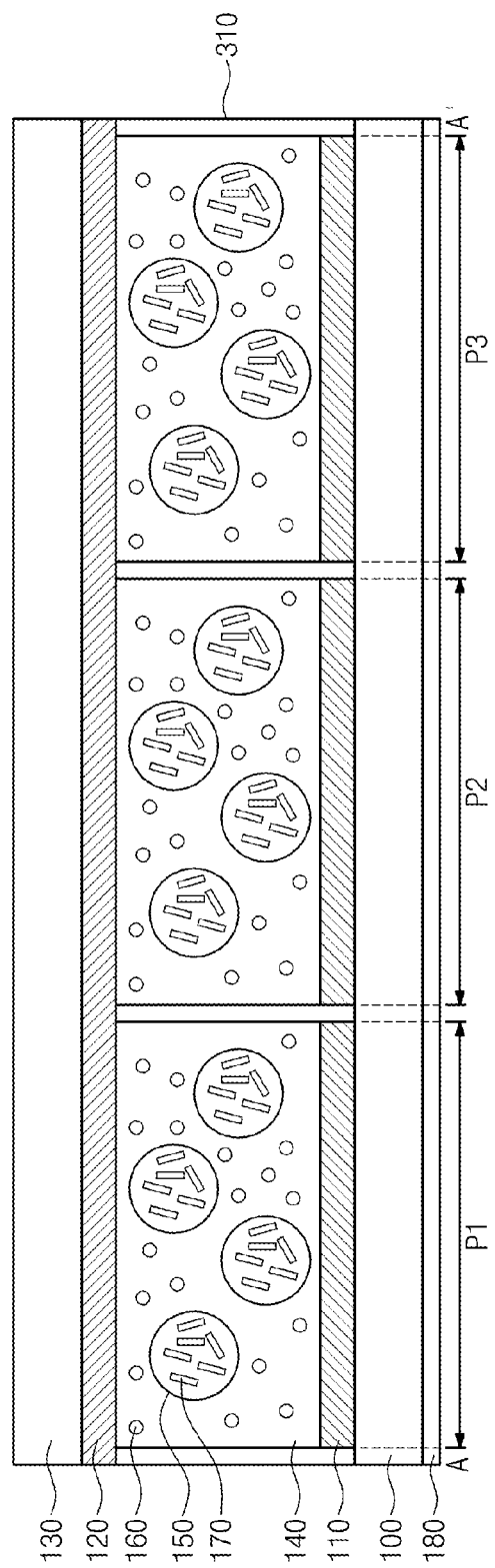

COLOR DISPLAY DEVICES

CROSS-REFERENCE TO RELATED APPLICATIONS

This U.S. non-provisional patent application claims priority under 35 U.S.C. §119 of Korean Patent Application No. 10-2016-0008215, filed on Jan. 22, 2016, the entire contents of which are hereby incorporated by reference.

BACKGROUND

The present disclosure herein relates to a color display device, and more particularly, to a transflective color display device including polymer dispersion type liquid crystals.

According to the progress of modern society to highly information oriented society, the significance of display industry is increasing. Recently, as the size of a screen increases and attains slimness, flat panel displays (FPD) such as liquid crystal displays (LCD), plasma display panels (PDP) and organic light emitting displays (OLED) are used. In the LCD, white light emitted from a back light is modified while passing through two polarizing plates and a liquid crystal layer, and the modified light passes through a color filter to take color. Such an LCD may be driven with a low voltage and have low power consumption. Due to the merits, the LCD is widely used in mobile portable devices, laptops, computer monitors, TV, etc. However, since the LCD partially uses the light from a back light due to the use of a polarizing plate and a color filter, light loss is large, and a lot of power is required for driving the back light.

SUMMARY

The present disclosure provides a color display device with minimized power consumption.

The present disclosure also provides a color display device having good visibility.

An embodiment of the inventive concept provides a color display device including a plurality of pixels. Each of the pixels may include a first transparent electrode and a second transparent electrode, opposing to each other, a polymer layer between the first transparent electrode and the second transparent electrode, a first coloring material dispersed in the polymer layer, liquid crystals provided in the polymer layer, and a second coloring material dispersed in the liquid crystals. The first coloring material and the second coloring material may present different colors, and each of the first coloring material and the second coloring material may include at least one of a red coloring material, a green coloring material, a blue coloring material, a yellow coloring material, a cyan coloring material, and a magenta coloring material.

In an embodiment, the first coloring material may include an aromatic ring structure or a condensed ring structure.

In an embodiment, an amount ratio of the first coloring material in the polymer layer may be from about 0.01% to about 80% by weight.

In an embodiment, an amount ratio of the second coloring material in the liquid crystals may be from about 0.01% to about 10% by weight.

In an embodiment, the color display device may further include a black coloring material dispersed in the liquid crystals.

In an embodiment, the black coloring material may include one structure of a structure obtained by connecting three naphthalene rings via two azo groups, a structure obtained by connecting two naphthalene rings and one aromatic ring via two azo groups, or a structure obtained by connecting three naphthalene rings and one aromatic ring via three azo groups.

In an embodiment, an amount of the black coloring material in the liquid crystals may be from about 0.01% to about 10% by weight.

In an embodiment, the color display device may include a plurality of pixel groups, and each of the pixel groups may include the plurality of pixels. The first coloring materials included in each of the plurality of pixels may present the same color, and the second coloring materials included in each of the plurality of pixels may present different colors from each other.

In an embodiment, the color display device may include a plurality of pixel groups, and each of the pixel groups may include the plurality of pixels. The first coloring materials included in each of the plurality of pixels may present different colors from each other, and the second coloring materials included in each of the plurality of pixels may present the same color.

In an embodiment, each of the pixels may further include a first transparent substrate provided on one side of the first transparent electrode, a second transparent substrate provided on one side of the second transparent electrode, and a reflecting layer provided on one side of the first transparent substrate. The first transparent electrode and the second transparent electrode may be provided between the first transparent substrate and the second transparent substrate, and the reflecting layer may be spaced apart from the first transparent electrode with the first transparent substrate therebetween.

In an embodiment, each of the pixels may further include a first transparent substrate provided on one side of the first transparent electrode, a second transparent substrate provided on one side of the second transparent electrode, and a light absorption layer provided on one side of the first transparent substrate. The first transparent electrode and the second transparent electrode may be provided between the first transparent substrate and the second transparent substrate, and the light absorption layer may be spaced apart from the first transparent electrode with the first transparent substrate therebetween.

In an embodiment, each of the pixels may include a light emitting device provided on one side of the first transparent electrode. The light emitting device may be spaced apart from the second transparent electrode with the first transparent electrode therebetween.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 15 is a cross-sectional view taken along line A-A' of FIG. 14.

DETAILED DESCRIPTION

Figure 1:
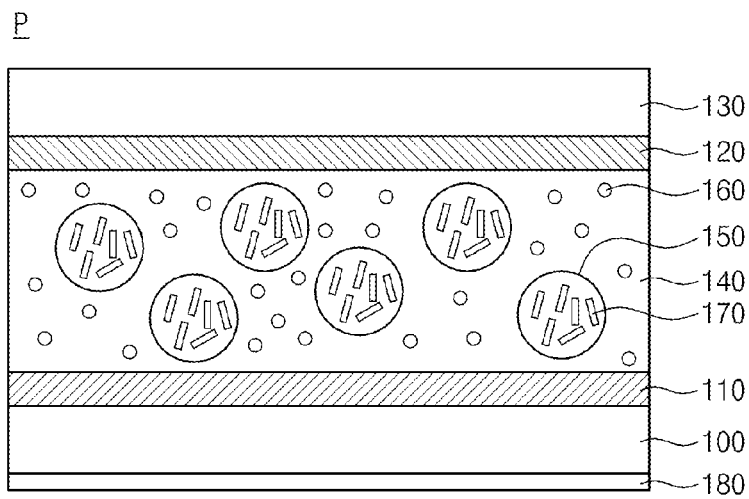
FIG. 1 is a cross-sectional view of a color display device according to some embodiments.

Hereinafter, preferred embodiments of the inventive concept will be explained in detail with reference to the accompanying drawings for the sufficient understanding of the configuration and effects of the inventive concept. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. In the drawings, the dimensions of each element are enlarged for convenience of explanation, and the scale of each element may be exaggerated or reduced.

Unless otherwise defined, all terms used herein have the same meaning as commonly understood by one of ordinary skill in the art to which this inventive concept belongs. Hereinafter, exemplary embodiments of the inventive concept will be described in detail with reference to the accompanying drawings.

FIG. 1 is a cross-sectional view of a color display device according to some embodiments of the inventive concept.

Referring to FIG. 1, a color display device may include a plurality of pixels P, and each of the pixels P may include a first substrate 100 and a second substrate 130 opposing to each other, a first electrode 110 and a second electrode 120 provided between the first substrate 100 and the second substrate 130 and opposing to each other, a polymer layer 140 between the first electrode 110 and the second electrode 120, liquid crystals 150 provided in the polymer layer 140, a first coloring material 160 dispersed in the polymer layer 140, and a second coloring material 170 dispersed in the liquid crystals 150.

The first substrate 100 and the second substrate 130 are transparent substrates, and may be, for example, glass substrates or plastic substrates. The first electrode 110 may be adjacent to the first substrate 100, and the second electrode 120 may be adjacent to the second substrate 130. The first electrode 110 and the second electrode 120 may be transparent electrodes. For example, the first electrode 110 and the second electrode 120 may include indium tin oxide (ITO), indium zinc oxide (IZO), silver nanowires, carbon nanotubes, graphene, PEDOT:PSS, polyaniline, polythiophene, or a mixture thereof.

The polymer layer 140 may include a hardened polymer material. The liquid crystals 150 may be provided in plural, and the plurality of the liquid crystals 150 may be dispersed in the polymer layer 140. Each of the first coloring material 160 and the second coloring material 170 may present different colors from each other. Each of the first coloring material 160 and the second coloring material 170 may include at least one of a red coloring material, a green coloring material, a blue coloring material, a yellow coloring material, a cyan coloring material, or a magenta coloring material. The first coloring material 160 and the second coloring material 170 may not be mixed each other. That is, the first coloring material 160 may not have miscibility with the liquid crystals 150 but may have dispersibility in the polymer layer 140, and the second coloring material 170 may not have miscibility with the polymer layer 140 but may have dispersibility in the liquid crystals 150.

The liquid crystals 150 in which the second coloring material 170 is dispersed, may be formed by physically mixing the liquid crystals 150 and the second coloring material 170. The polymer layer 140 may be formed by injecting a solution including the first coloring material 160, the liquid crystals 150 in which the second coloring material 170 is dispersed, a monomer (or an oligomer), and a reaction initiator onto the first electrode 110, and irradiating ultraviolet light to harden the solution. For example, the monomer may be a vinyl monomer, and the vinyl monomer may include at least one of triethylopropane triacrylate (TMPTA), tri(propylene glycol) diacrylate (TPGDA), pentaerythritol triacrylate (PETA), trimethylolpropane ethoxylate triacrylate (TMPEOTA), methyl methacrylate (MMA), methacrylate (MA), tri(propylene glycol) glycerolate diacrylate (TPGDA), vinylacrylate (VA), ethylene glycol dimethacrylate (EGDA), epoxy acrylate monomer or oligomer, 1,6-hexanediol diacrylate (HAD), styrene (ST), divinyl benzene (DVB), acrylonitrile (AN), vinylidene chloride (VDC), vinylbenzyl chloride (VBC), vinyl stearate (VS), or vinyl propionate (VP). The reaction initiator may be a photoinitiator, a thermal initiator, or an oxidation reduction initiator. The photo initiator may include at least one of 1-hydroxy-cyclohexyl-phenyl-ketone (Irgacure 907), 2-methyl-1[4-(methylthio)phenyl]-2-morpholinopropane-1-one (Irgacure 184C), 2-hydroxy-2-methyl-1-phenyl-propane-1-one (Darocur 1173), an initiator (Irgacure 500) obtained by mixing 50 wt % of Irgacure 184 (Irgacure 184C) and 50 wt % of benzophenone, an initiator (Irgacure 1000) obtained by mixing 20 wt % of Irgacure 184 and 80 wt % of Irgacure 1173, 2-hydroxy-1-[4-(2-hydroxyethoxy)phenyl]-2-methyl-1-propanone (Irgacure 2959), methylbenzoylformate (Darocur MBF), alpha, alpha-dimethoxy-alpha-phenylacetophenone (Irgacure 651), 2-benzyl-2-(dimethylamino)-1-[4-(4-morpholinyl) phenyl]-1-butanone (Irgacure 369)), an initiator (Irgacure 1300) obtained by mixing 30 wt % of Irgacure 369 and 70 wt % of Irgacure 651, diphenyl (2,4,6-trimethylbenzoyl)-phosphine oxide (Darocur TPO), an initiator (Darocur 4265) obtained by mixing 50 wt % of Darocur TPO and 50 wt % of Darocur 1173, phosphine oxide, phenyl bis(2,4,6-trimethyl benzoyl (Irgacure 819), an initiator (Irgacure 2005) obtained by mixing 5 wt % of Irgacure 819 and 95 wt % of Darocur 1173, an initiator (Irgacure 2010) obtained by mixing 10 wt % of Irgacure 819 and 90 wt % of Darocur 1173, an initiator (Irgacure 2020) obtained by mixing 20 wt % of Irgacure 819 and 80 wt % of Darocur 1173, a mixture initiator (HSP 188) containing bis(.eta.5-2,4-cyclopentadien-1-yl) bis[2,6-difluoro-3-(1H-pyrrol-1-yl)phenyl]titanium (Irgacure 784), and benzophenone, or 1-hydroxy-cyclohexylphenyl-ketone (CPA). The thermal initiator may include, for example, at least one of benzoyl peroxide (BP), acetyl peroxide (AP), dilauryl peroxide (DP), di-tert-butyl peroxide (t-BTP), cumyl hydroperoxide (CHP), hydrogen peroxide (HP), potassium peroxide (PP), 2,2'-azobisisobutyronitrile (AIBN), an azo compound initiator, or silver alkyls. The oxidation reduction initiator may include, for example, persulfate ($K_2S_2O_8$) and/or a redox initiator.

The first coloring material 160 may include an aromatic ring structure or a condensed ring structure. According to some embodiments, the first coloring material 160 may include at least one of the red coloring material, the green coloring material, or the blue coloring material. The amount ratio of the first coloring material 160 in the polymer layer 140 may be from about 0.01% to about 80% by weight.

In the case that the first coloring material 160 includes the blue coloring material, the blue coloring material may have a structure of the following Formula 1 or 2.

[Formula 1]

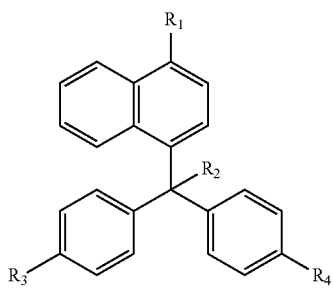

[Formula 2]

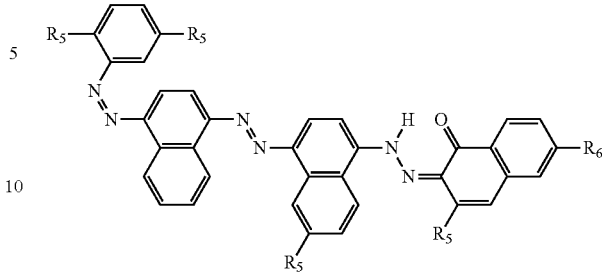

where $R_1$ is one of —$NHC_4H_9$, —$NHC_2H_5$, —$NHCH_3$, —$NH_2$, or —$NH(C_nH_{2n+1}, 3 \leq n \leq 20)$, $R_2$ is one of —H, —OH, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group. Each of $R_3$ and $R_4$ is one of —$NHC_4H_9$, —$NHC_2H_5$, —$NHCH_3$, —$NH_2$, —$NH(C_nH_{2n+1}, 3 \leq n \leq 20)$, —H, —OH, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group. $R_5$ is one of —$SO_3Na$ or —$SO_3H$, and $R_6$ is one of —$NH_2$, —$NHCH_3$ or —$NHC_6H_5$.

In the case that the first coloring material 160 includes the red coloring material, the red coloring material may have a structure of the following Formula 3 or 4.

[Formula 3]

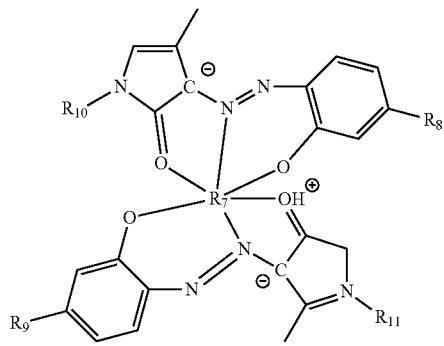

[Formula 4]

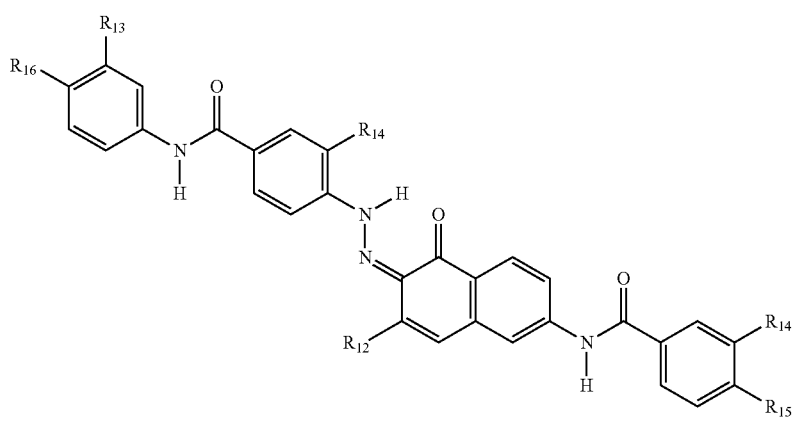

where $R_7$ is one of Cr, Mo, W, Mn, V, Nb or Ta, each of $R_8$, $R_9$, $R_{10}$ and $R_{11}$ is one of —$NO_2$, —$NH_3$, —$NHCH_3$, —$NHC_4H_9$, —$NHC_2H_5$, —$NH(CnH2n+1, 3≤n≤20)$, or at least one aromatic group, $R_{12}$ is one of —$SO_3Na$ or —$SO_3H$, $R_{13}$ is one of —COOH or —COONa, each of $R_{14}$ and $R_{15}$ is one of —H, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, —$NHC_4H_9$, —$NHC_2H_5$, —$NHCH_3$, —$NH_2$, —$NH(CnH2n+1, 3≤n≤20)$, or at least one aromatic group, and $R_{16}$ is one of —H, —OH, —$SO_3H$ or —COOH.

In the case that the first coloring material 160 includes the green coloring material, the green coloring material may have a structure of the following Formula 5.

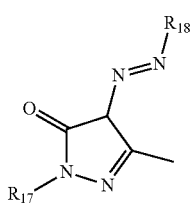

[Formula 5]

where each of $R_{17}$ and $R_{18}$ has one of the structures of the following Formulae 6 to 11.

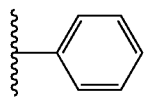

[Formula 6]

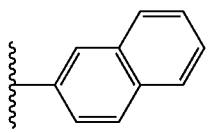

[Formula 7]

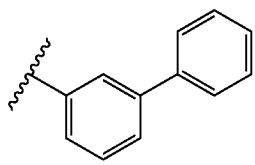

[Formula 8]

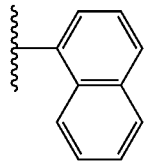

[Formula 9]

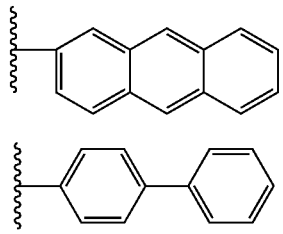

[Formula 10]

[Formula 11]

In some embodiments, the second coloring material 170 may include at least one of the yellow coloring material, the cyan coloring material, or the magenta coloring material.

The amount ratio of the second coloring material 170 in the liquid crystals 150 may be from about 0.01% to about 10% by weight.

In the case that the second coloring material 170 includes the yellow coloring material, the yellow coloring material may have a structure of the following Formula 12.

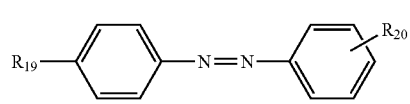

[Formula 12]

where $R_{19}$ is one of —$N(CH_3)_2$, —$N(C_2H_5)_2$, —$N(CnH2n+1, 3≤n≤20)_2$, $R_{20}$ is one of —H, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group.

In the case that the second coloring material 170 includes the magenta coloring material, the magenta coloring material may have a structure of the following Formula 13.

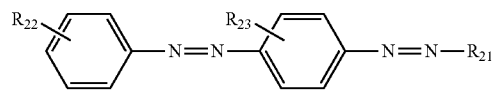

[Formula 13]

where each of $R_{22}$ and $R_{23}$ is one of —H, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group, and $R^{21}$ has one of the structures of the following Formulae 14 to 25.

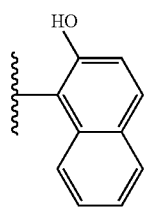

[Formula 14]

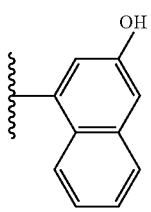

[Formula 15]

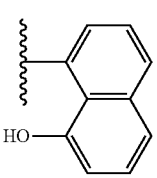

[Formula 16]

[Formula 17]
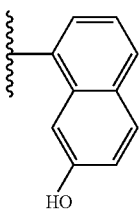

[Formula 18]
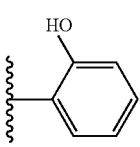

[Formula 19]
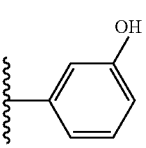

[Formula 20]
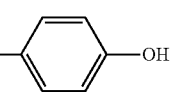

[Formula 21]
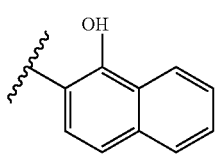

[Formula 22]
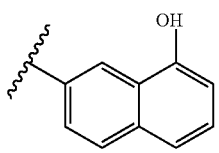

[Formula 23]
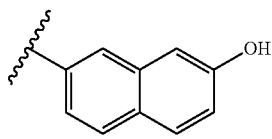

[Formula 24]
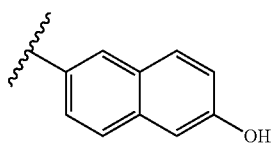

[Formula 25]
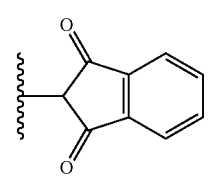

In the case that the second coloring material 170 includes the cyan coloring material, the cyan coloring material may have a structure of the following Formula 26.

[Formula 26]
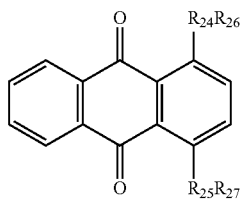

where each of $R_{24}$ and $R_{25}$ is one of O, S, Se, $CH_2$, NH or an ester, each of $R_{26}$ and $R_{27}$ is one of —H, —$CH_3$, —$C_2H_5$, —$C_3H_7$, —$C_4H_9$, —$C_5H_{11}$, linear alkyl having 6 to 20 carbon atoms, branch alkyl having 6 to 20 carbon atoms, linear alkene having 6 to 20 carbon atoms, branch alkene having 6 to 20 carbon atoms, or at least one aromatic group.

Each of the pixels P may further include a reflecting layer 180 provided on one side of the first substrate 100. The reflecting layer 180 may be spaced apart from the first electrode 110 with the first substrate 100 therebetween. That is, the reflecting layer 180 may be provided on one side of the first substrate 100, and the first electrode 110 may be provided on the other side facing the one side of the first substrate 100.

Figure 2:
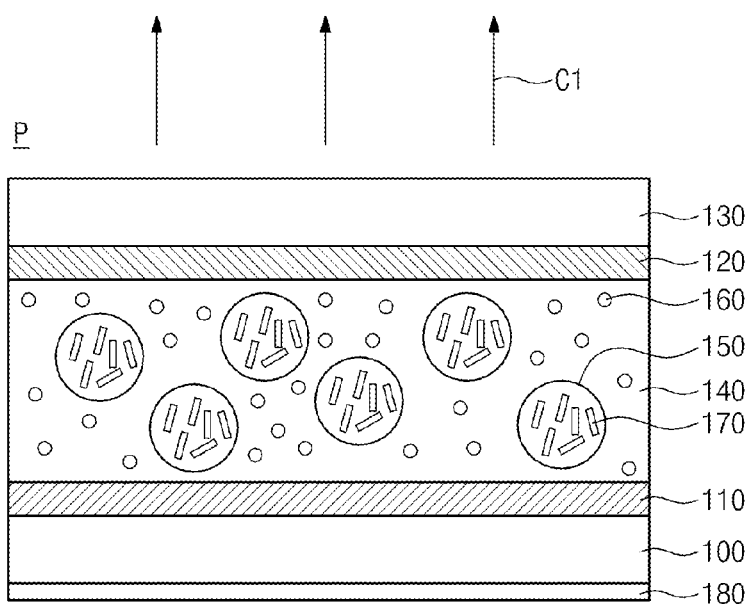
FIGS. 2 to 4 are diagrams for explaining the driving method of the color display device of FIG. 1.
Figure 3:
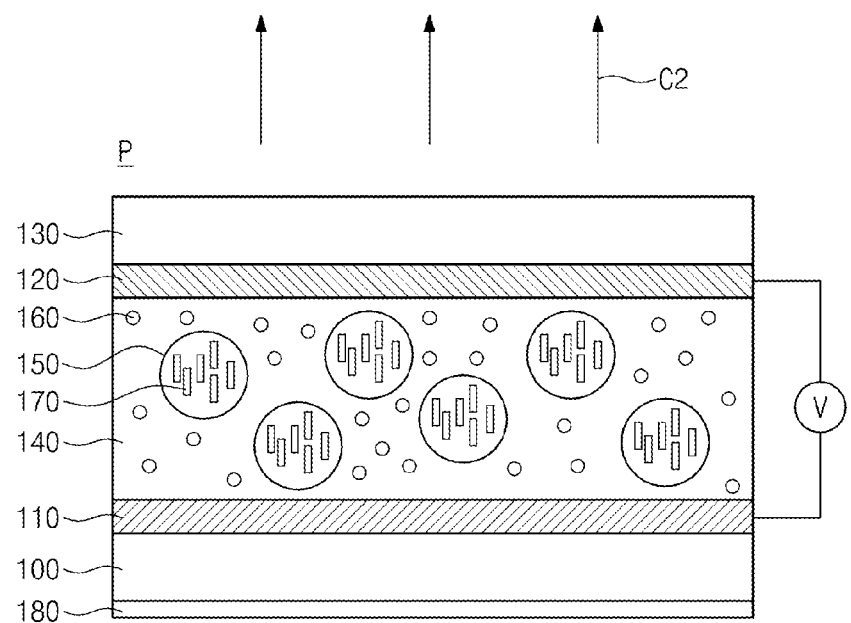
Figure 4:
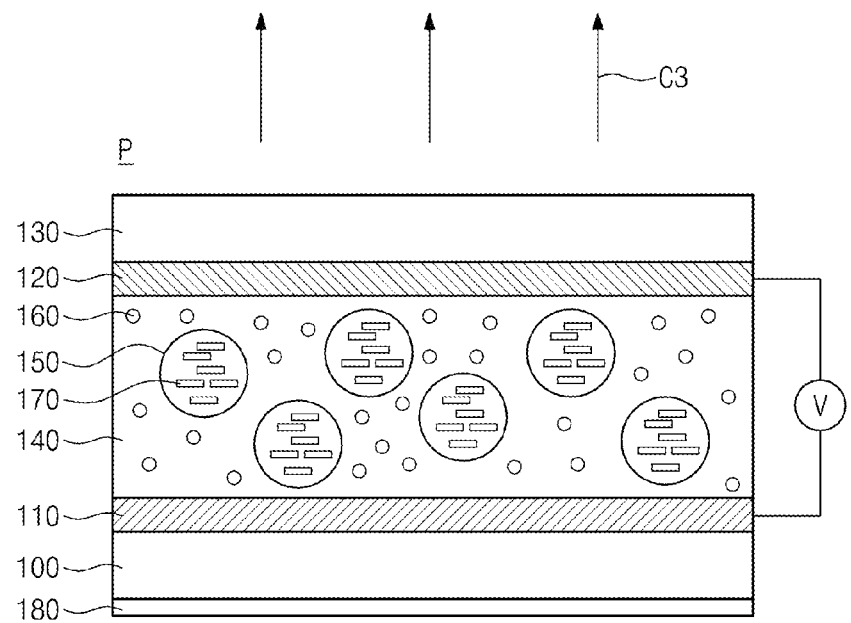

FIGS. 2 to 4 are diagrams for explaining the driving method of the color display device of FIG. 1. Hereinafter the explanation will focus on one pixel P for simple explanation.

Referring to FIG. 2, in the case that a voltage is not applied to the pixel P, the second coloring material 170 may be randomly arranged in the liquid crystals 150. In this case, incident light may be scattered due to the difference between the refractive index of the polymer layer 140 and the refractive index of the liquid crystals 150. The scattered light may be selectively scattered to light having a specific wavelength by the first coloring materials 160 dispersed in the polymer layer 140 and may be emitted out through the second substrate 130. In addition, the scattered light may make an interaction with the second coloring material 170 which is randomly arranged in the liquid crystals 150. Accordingly, the pixel P may take a first color C1 having the same color as the first coloring material 160 and a certain chroma under the influence of the second coloring material 170. For example, in the case that the first coloring material 160 includes the blue coloring material, the first color C1 may be blue having a certain chroma.

Referring to FIGS. 3 and 4, in the case that a voltage V is applied to the pixel P, the second coloring material 170 may be arranged in parallel (FIG. 3) or perpendicular (FIG. 4) to an electric field formed between the first electrode 110 and the second electrode 120. Particularly, liquid crystal molecules may be arranged in parallel or perpendicular to the electric field due to the dielectric anisotropy of the liquid crystal molecules in the liquid crystals 150, and the second coloring material 170 may be arranged in the same direction as the liquid crystal molecules. In this case, the difference between the refractive index of the liquid crystals 150 and the refractive index of the polymer layer 140 may be minimized, and incident light may penetrate the polymer layer 140 and the liquid crystals 150 and may be reflected by the reflecting layer 180 to be emitted out through the second substrate 130.

As shown in FIG. 3, in the case that the second coloring material 170 is arranged in parallel to the electric field, influences due to the second coloring material 170 may be minimized. Accordingly, the pixel P may take a second color C2 which has the same color as the first coloring material 160, but a higher chroma than the first color C1. For example, in the case that the first coloring material 160 includes the blue coloring material, the second color C2 may be blue having a higher chroma than the first color C1. As shown in FIG. 4, in the case that the second coloring material 170 is arranged in perpendicular to the electric field, influences due to the second coloring material 170 may be maximized. Accordingly, the pixel P may take a third color C3 which has the same color as the first coloring material 160, but a lower chroma than the first color C1. For example, in the case that the first coloring material 160 includes the blue coloring material, the third color C3 may be blue having a lower chroma than the first color C1.

Figure 5:
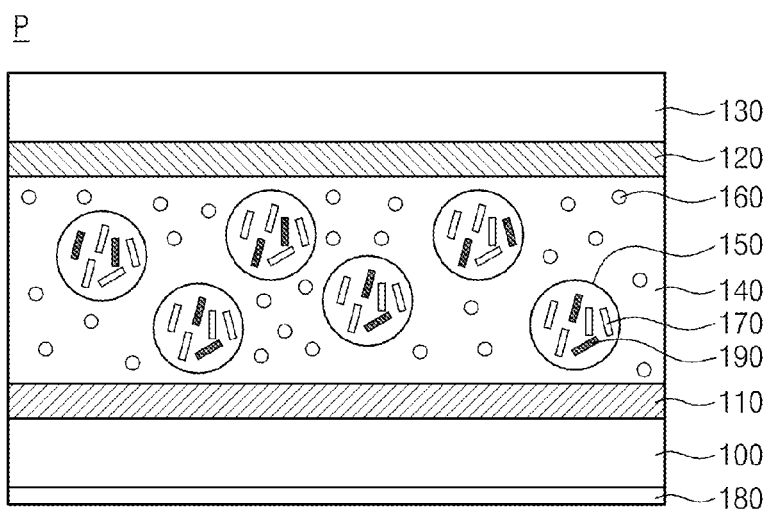
FIG. 5 is a cross-sectional view of a color display device according to some embodiments.

FIG. 5 is a cross-sectional view of a color display device according to some embodiment. The same reference numerals are provided for the same elements of the color display device according to some embodiments explained referring to FIG. 1, and only different points from the color display device of FIG. 1 will be explained for simple explanation.

Referring to FIG. 5, each of the pixel P may include a black coloring material 190 dispersed in the liquid crystals 150. That is, the first coloring material 160 may not have miscibility with the liquid crystals 150 but may be dispersed in the polymer layer 140, and the second coloring material 170 and the black coloring material 190 may not have miscibility with the polymer layer 140 but may be dispersed in the liquid crystals 150.

The black coloring material 170 may include one of a structure obtained by connecting three naphthalene rings via two azo groups, a structure obtained by connecting two naphthalene rings and one aromatic ring via two azo groups, or a structure obtained by connecting three naphthalene rings and one aromatic ring via three azo groups. For example, the black coloring material 170 may have one of the structures of the following Formulae 27 to 33.

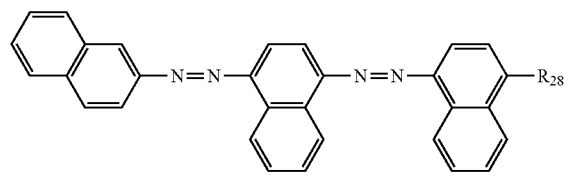

[Formula 27]

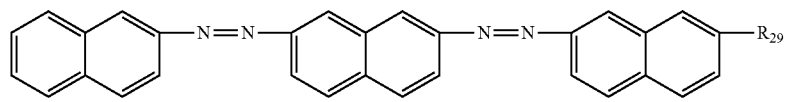

[Formula 28]

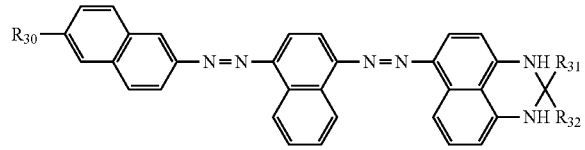

[Formula 29]

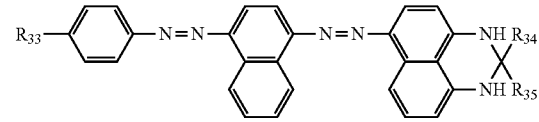

[Formula 30]

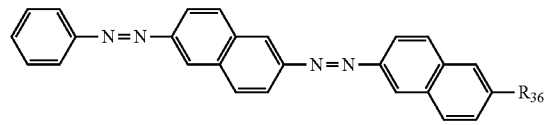

[Formula 31]

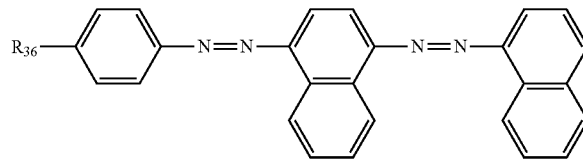

[Formula 32]

[Formula 33]

where each of $R_{28}$, $R_{29}$, $R_{30}$, $R_{31}$ and $R_{32}$ is one of —H, —CH$_3$, —C$_2$H$_5$, —C$_3$H$_7$, —C$_4$H$_9$, —C$_5$H$_{11}$, linear alkyl having 6 to 20 carbon atoms, branch alkyl having 6 to 20 carbon atoms. Each of $R_{33}$, $R_{34}$, $R_{35}$, $R_{36}$ and $R_{37}$ is one of —H, —CH$_3$, —C$_2$H$_5$, —C$_3$H$_7$, —C$_4$H$_9$, —C$_5$H$_{11}$, linear alkyl having 6 to 20 carbon atoms, branch alkyl having 6 to 20 carbon atoms. $R_{38}$ is one of —H, —CH$_3$, —C$_2$H$_5$, —C$_3$H$_7$, —C$_4$H$_9$, —C$_5$H$_{11}$, linear alkyl having 6 to 20 carbon atoms, or branch alkyl having 6 to 20 carbon atoms.

The amount ratio of the black coloring material 190 in the liquid crystals 150 may be from about 0.01% to about 10% by weight.

Figure 6:
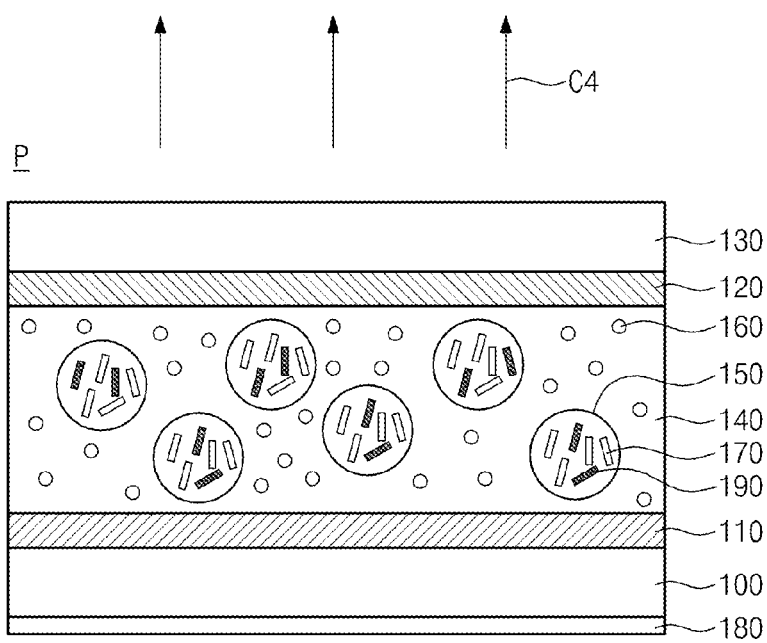
FIGS. 6 to 8 are diagrams for explaining the driving method of the color display device of FIG. 5.
Figure 7:
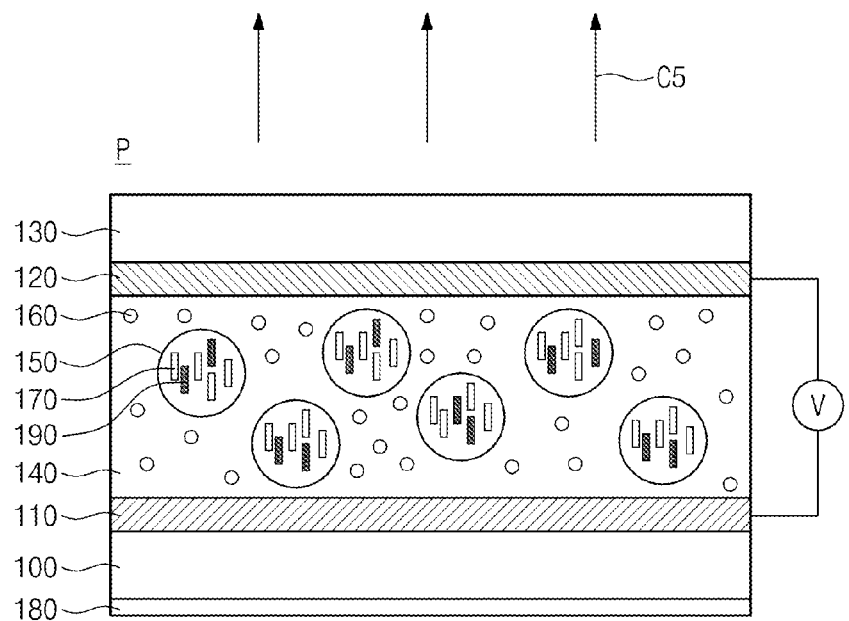
Figure 8:
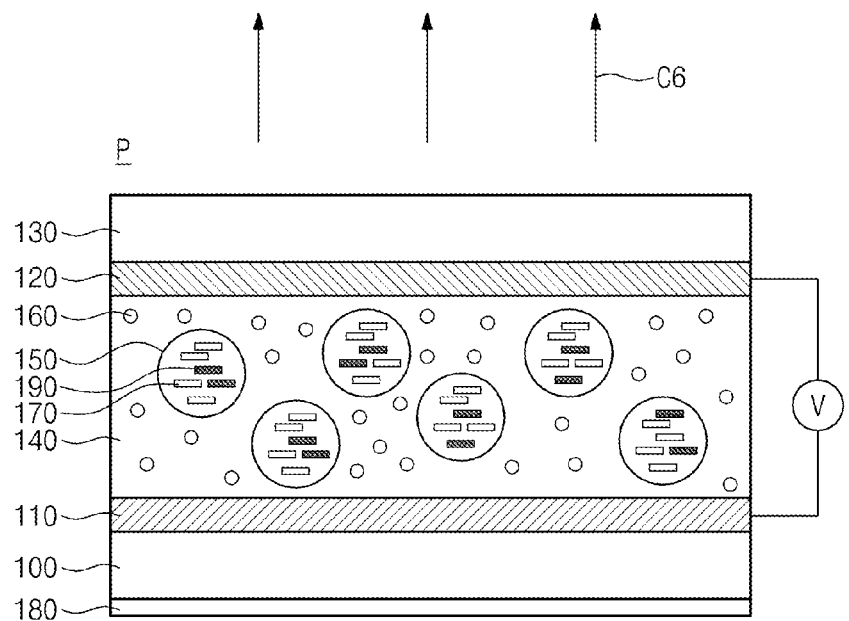

FIGS. 6 to 8 are diagrams for explaining the driving method of the color display device of FIG. 5. Hereinafter the explanation will focus on one pixel P for simple explanation.

Referring to FIG. 6, in the case that an electric field is not applied to the pixel P, the second coloring material 170 and the black coloring material 190 may be randomly arranged in the liquid crystals 150. In this case, incident light may be scattered due to the difference between the refractive index of the polymer layer 140 and the refractive index of the liquid crystals 150. The scattered light may be selectively scattered to light having a specific wavelength by the first coloring materials 160 dispersed in the polymer layer 140 and may be emitted out through the second substrate 130. In addition, the scattered light may make an interaction with the second coloring material 170 and the black coloring material 190 which are randomly arranged in the liquid crystals 150. Accordingly, the pixel P may take a fourth color C4 having the same color as the first coloring material 160 and a certain chroma and brightness under the influence of the second coloring material 170 and the black coloring material 190. For example, in the case that the first coloring material 160 includes the blue coloring material, the fourth color C4 may be blue having a certain chroma and brightness.

Referring to FIGS. 7 and 8, in the case that a voltage V is applied to the pixel P, the second coloring material 170 and the black coloring material 190 may be arranged in parallel (FIG. 7) or perpendicular (FIG. 8) to an electric field formed between the first electrode 110 and the second electrode 120. Particularly, liquid crystal molecules may be arranged in parallel or perpendicular to the electric field due to the dielectric anisotropy of the liquid crystal molecules in the liquid crystals 150, and the second coloring material 170 and the black coloring material 190 may be arranged in the same direction as the liquid crystal molecules. In this case, the difference between the refractive index of the liquid crystals 150 and the refractive index of the polymer layer 140 may be minimized, and incident light may penetrate the polymer layer 140 and the liquid crystals 150 and may be reflected by the reflecting layer 180 to be emitted out through the second substrate 130.

As shown in FIG. 7, in the case that the second coloring material 170 and the black coloring material 190 are arranged in parallel to the electric field, influences due to the second coloring material 170 and the black coloring material 190 may be minimized. Accordingly, the pixel P may take a fifth color C5 which has the same color as the first coloring material C1 but a higher chroma and brightness than the fourth color C4. For example, in the case that the first coloring material 160 includes the blue coloring material, the fifth color C5 may be blue having a higher chroma and brightness than the fourth color C4. As shown in FIG. 8, in the case that the second coloring material 170 and the black coloring material 190 are arranged in perpendicular to the electric field, influences due to the second coloring material 170 and the black coloring material 190 may be maximized. Accordingly, the pixel P may take a sixth color C6 which has the same color as the first coloring material 160 but a lower chroma and brightness than the fourth color C4. For example, in the case that the first coloring material 160 includes the blue coloring material, the sixth color C6 may be blue having a lower chroma and brightness than the fourth color C4.

Figure 9:
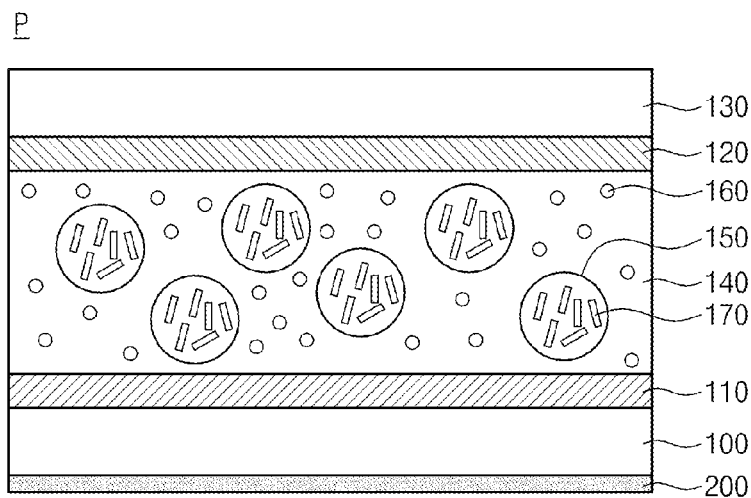
FIG. 9 is a cross-sectional view of a color display device according to some embodiments.

FIG. 9 is a cross-sectional view of a color display device according to some embodiment. The same reference numerals are provided for the same elements of the color display device according to some embodiments explained referring to FIG. 1, and only different points from the color display device of FIG. 1 will be explained for simple explanation.

Referring to FIG. 9, each of the pixels P may include a first substrate 100 and a second substrate 130 opposed to each other, a first electrode 110 and a second electrode 120 provided between the first substrate 100 and the second substrate 130 and opposed to each other, a polymer layer 140 between the first electrode 110 and the second electrode 120, liquid crystals 150 provided in the polymer layer 140, a first coloring material 160 dispersed in the polymer layer 140, and a second coloring material 170 dispersed in the liquid crystals 150. The first electrode 110 may be adjacent to the first substrate 100, and the second electrode 120 may be adjacent to the second substrate 130.

Each of the pixels P may further include a light absorption layer 200 provided on one side of the first substrate 100. The light absorption layer 200 may be spaced apart from the first electrode 110 with the first substrate 100 therebetween. That is, the light absorption layer 200 may be provided on one side of the first substrate 100, and the first electrode 110 may be provided on the other side opposed to the one side of the first substrate 100.

Figure 10:
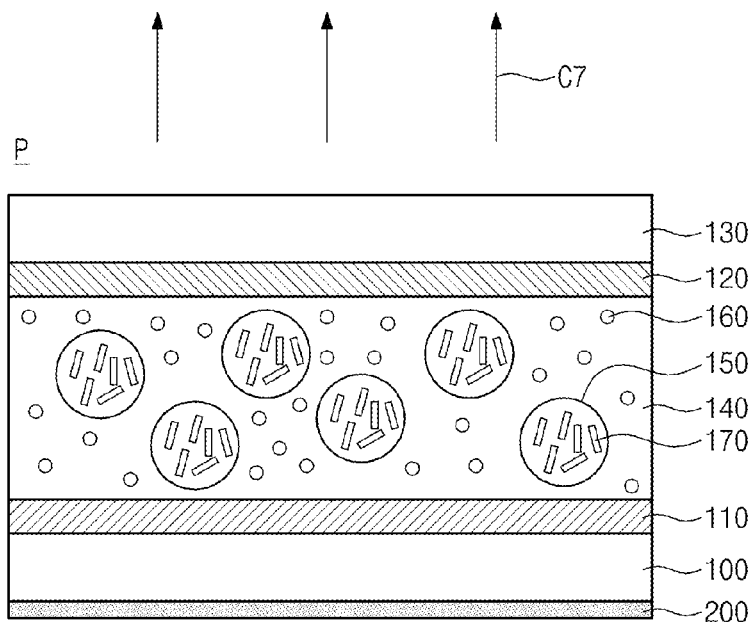
FIGS. 10 to 12 are diagrams for explaining the driving method of the color display device of FIG. 9.
Figure 11:
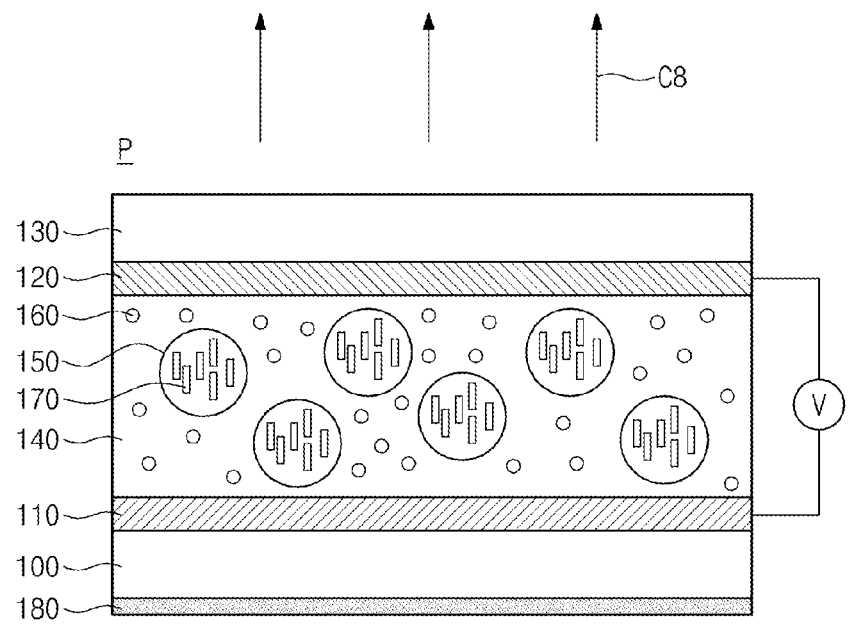
Figure 12:
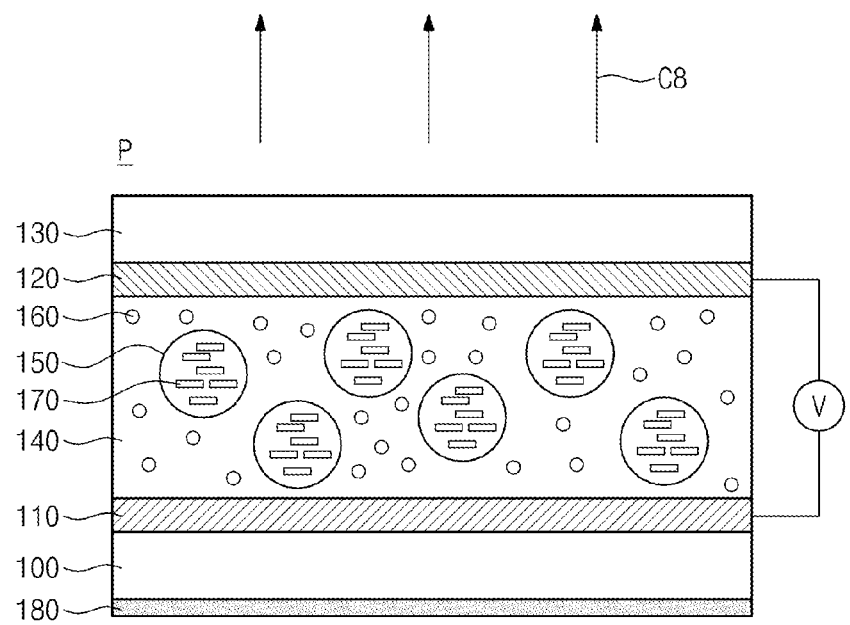

FIGS. 10 to 12 are diagrams for explaining the driving method of the color display device of FIG. 9. Hereinafter the explanation will focus on one pixel P for simple explanation.

Referring to FIG. 10, in the case that a voltage is not applied to the pixel P, the second coloring material 170 may be randomly arranged in the liquid crystals 150. In this case, as explained referring to FIG. 2, incident light may be scattered due to the difference between the refractive index of the polymer layer 140 and the refractive index of the liquid crystals 150 and emitted out through the second substrate 130. As explained referring to FIG. 2, the pixel P may take a seventh color C7 having the same color as the first coloring material 160 but having a certain chroma under the influence of the second coloring material 170. For example, in the case that the first coloring material 160 includes the blue coloring material, the seventh color C7 may be blue having a certain chroma.

Referring to FIGS. 11 and 12, in the case that a voltage V is applied to the pixel P, the second coloring material 170 may be arranged in parallel (FIG. 11) or perpendicular (FIG. 12) to an electric field formed between the first electrode 110 and the second electrode 120. In this case, the difference between the refractive index of the liquid crystals 150 and the refractive index of the polymer layer 140 may be minimized, and incident light may penetrate the polymer layer 140 and the liquid crystals 150, and the penetrated light may be absorbed by the light absorption layer 200. Therefore, the pixel P may take black C8.

Figure 13:
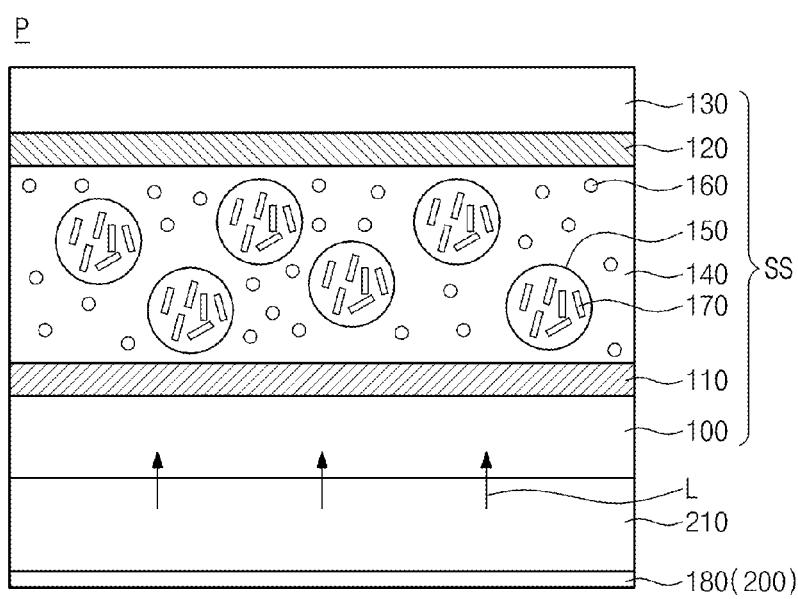
FIG. 13 is a cross-sectional view of a color display device according to some embodiments.

FIG. 13 is a cross-sectional view of a color display device according to some embodiment. The same reference numerals are provided for the same elements of the color display device according to some embodiments explained referring to FIG. 1, and only different points from the color display device of FIG. 1 will be explained for simple explanation.

Referring to FIG. 13, the color display device may include a light emitting device 210 laminated on the first substrate 100. According to some embodiments, the light emitting device 210 may be provided between the first substrate 100 and the reflecting layer 180 (or the light absorption layer 200). The first substrate 100, the first electrode 110, the second electrode 120, the second substrate 130, the polymer layer 140 in which the first coloring material 160 is dispersed, and the liquid crystals 150 in which the second coloring material 170 is dispersed, provided on the light emitting device 210 may be defined as a laminated structure SS. That is, the light emitting device 210 may be provided between the laminated structure SS and the reflecting layer 180 (or the light absorption layer 200). The light emitting layer 210 is a self-luminescent device (for example, an organic light emitting device, etc.) and may emit red light, green light, blue light, etc., or only white light.

In the case that the light emitting device 210 is not driven, incident light, as explained referring to FIG. 2, may be scattered due to the difference between the refractive index of the polymer layer 140 and the refractive index of the liquid crystals 150 and may be emitted out through the second substrate 130. Alternatively, as descried referring to FIGS. 3 and 4, the incident light may penetrate the polymer layer 140, the liquid crystals 150, and the light emitting device 210, be reflected by the reflecting layer 180, and be emitted out through the second substrate 130. Accordingly, the pixel P may take the same colors C1, C2 or C3 as explained above referring to FIGS. 2 to 4.

In the case that the light emitting device 210 is driven, light L generated from the light emitting device 210 may penetrate the laminated structure SS and be emitted out through the second substrate 130. In this case, the laminated structure SS may be, as explained referring to FIGS. 3 and 4, a state when a voltage is applied. In detail, in the case that a voltage is applied to the laminated structure SS, the second coloring material 170 may be arranged in parallel (FIG. 3) or perpendicular (FIG. 4) to an electric field formed between the first electrode 110 and the second electrode 120. Accordingly, the light L generated from the light emitting device 210 may penetrate the laminated structure SS and be emitted out through the second substrate 130.

As shown in FIG. 3, in the case that the second coloring material 170 is arranged in parallel to the electric field, influences of the second coloring material 170 to the light L may be minimized. Accordingly, in the case that the light L is white light, the pixel P may take a color C2 having the same color as the first coloring material 160 with a relatively high chroma. As shown in FIG. 4, in the case that the second coloring material 170 is arranged in perpendicular to the electric field, influences of the second coloring material 170 to the light L may be maximized. Accordingly, in the case that the light L is white light, the pixel P may take a color C3 having the same color as the first coloring material 160 with a relatively low chroma.

According to an embodiment, in the case that the amount of the incident light is insufficient due to a dark external environment, images with good visibility may be attained by driving the light emitting device 210.

Figure 14:
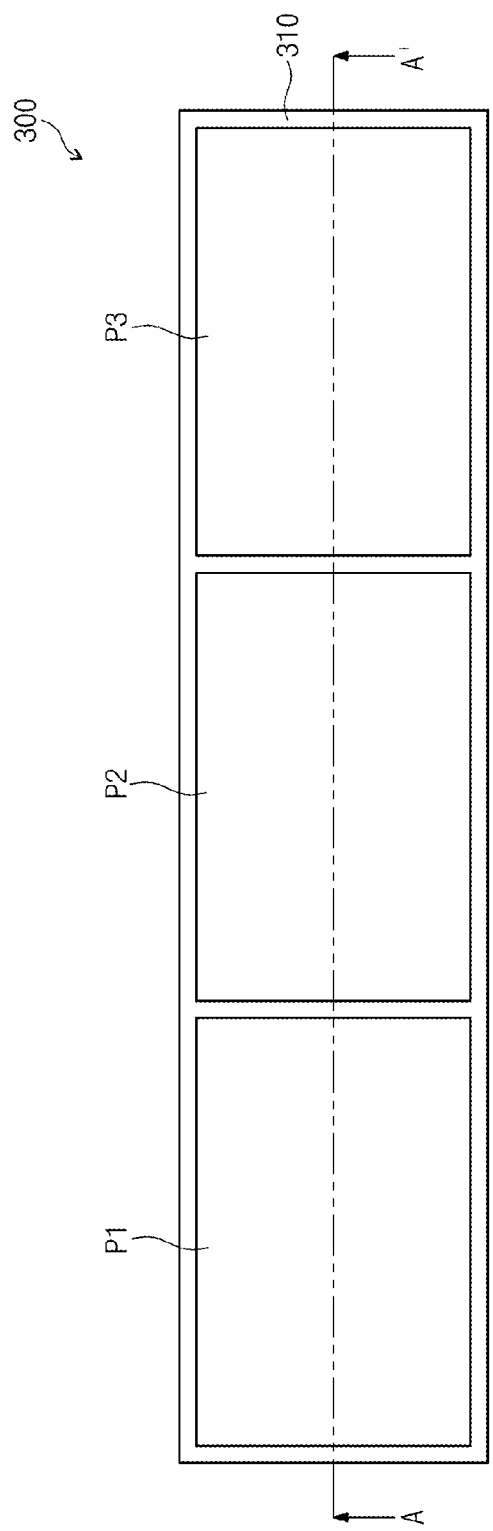
FIG. 14 is a plan view illustrating the pixel group of a color display device according to some embodiments.

FIG. 14 is a plan view illustrating the pixel group of a color display device according to some embodiments, and FIG. 15 is a cross-sectional view taken along line A-A' of FIG. 14.

Referring to FIGS. 14 and 15, the color display device may include a plurality of pixel groups 300, and each of the pixel groups 300 may include a plurality of pixels P1, P2 and P3. As explained referring to FIG. 1, each of the plurality of pixels P1, P2 and P3 may include a first substrate 100 and a second substrate 130 opposed to each other, a first electrode 110 and a second electrode 120 provided between the first substrate 100 and the second substrate 130 and opposed to each other, a polymer layer 140 between the first electrode 110 and the second electrode 120, liquid crystals 150 provided in the polymer layer 140, a first coloring material 160 dispersed in the polymer layer 140, a second coloring material 170 dispersed in the liquid crystals 150, and a reflecting layer 180 provided on one side of the first substrate 100. According to some embodiments, each of the pixels P1, P2 and P3 may include the light absorption layer 200 provided on one side of the first substrate 100 as explained referring to FIG. 9, and/or may include a black coloring material 190 dispersed in the liquid crystals 150 as explained referring to FIG. 5.

The plurality of pixels P1, P2 and P3 may be provided between the first substrate 100 and the second substrate 130 opposed to each other, and a partition 310 may be provided between the first substrate 100 and the second substrate 130 to separate the plurality of the pixels P1, P2 and P3 from each other. In a display device with a passive matrix driving type, the first electrodes 110 of the plurality of the pixels P1, P2 and P3 may be formed in parallel in a stripe shape, and the second electrodes 120 of the plurality of the pixels P1, P2 and P3 may be formed in parallel in a stripe shape so as to cross the first electrodes 110. In a display device with an active matrix driving type, the second electrodes 120 of the plurality of the pixels P1, P2 and P3 may be formed in one body and may be used as a common electrode. The first electrodes 110 of the plurality of the pixels P1, P2 and P3 may be formed by patterning so as to correspond to each of the plurality of the pixels P1, P2 and P3.

According to some embodiments, the first coloring materials 160 included in the plurality of pixels P1, P2 and P3 may take the same color, and the second coloring materials 170 included in the plurality of the pixels P1, P2 and P3 may take different colors. According to another embodiment, the first coloring materials 160 included in the plurality of pixels P1, P2 and P3 may take different colors, and the second coloring materials 170 included in the plurality of the pixels P1, P2 and P3 may take the same color. However, the inventive concept is not limited thereto.

According to the inventive concept, one pixel may include liquid crystals provided in a polymer, a first coloring material dispersed in the polymer, and a second coloring material dispersed in the liquid crystals. The first coloring material and the second coloring material may take different colors. By controlling the arrangement of the second coloring material dispersed in the liquid crystals using a voltage applied to the pixel, the different colors of the pixels may be attained. Therefore, a color display device securing good visibility with a low power consumption may be provided.

According to the inventive concept, one pixel may include liquid crystals provided in a polymer, a first coloring material dispersed in the polymer, and a second coloring material dispersed in the liquid crystals. The first coloring material and the second coloring material may present different colors. By controlling the orientation of the second coloring material dispersed in the liquid crystals using a voltage applied to the pixel, the different color of the pixel may be attained. A color display device securing good visibility with low power consumption may be provided.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A color display device comprising a plurality of pixels, each of the pixels comprising:
a first transparent electrode and a second transparent electrode, opposing to each other;
a polymer layer between the first transparent electrode and the second transparent electrode;
a first coloring material dispersed in the polymer layer;
liquid crystals provided in the polymer layer; and
a second coloring material dispersed in the liquid crystals, the first coloring material and the second coloring material presenting different colors, each of the first coloring material and the second coloring material comprising at least one of a red coloring material, a green coloring material, a blue coloring material, a yellow coloring material, a cyan coloring material, and a magenta coloring material.

2. The color display device of claim 1, wherein the first coloring material comprises an aromatic ring structure or a condensed ring structure.

3. The color display device of claim 2, wherein an amount ratio of the first coloring material in the polymer layer is from 0.01% to 80% by weight.

4. The color display device of claim 2, wherein the first coloring material comprises the blue coloring material, and the blue coloring material has a structure of the following Formula 1 or 2:

[Formula 1]

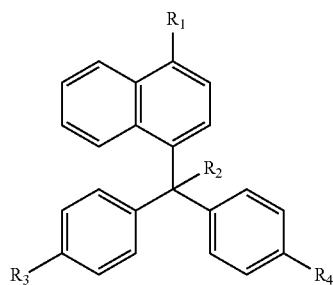

[Formula 2]

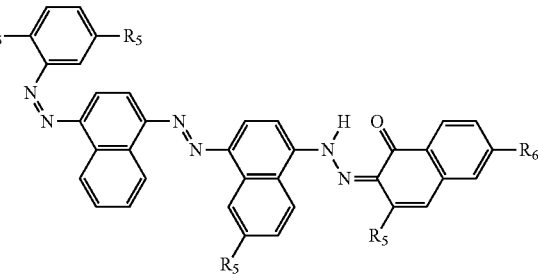

where $R_1$ is one of —$NHC_4H_9$, —$NHC_2H_5$, —$NHCH_3$, —$NH_2$, or —$NH(CnH2n+1, 3 \leq n \leq 20)$, $R_2$ is one of —H, —OH, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group, each of $R_3$ and $R_4$ is one of —$NHC_4H_9$, —$NHC_2H_5$, —$NHCH_3$, —$NH_2$, —$NH(CnH2n+1, 3 \leq n \leq 20)$, —H, —OH, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group, $R_5$ is one of —$SO_3Na$ or —$SO_3H$, and $R_6$ is one of —$NH_2$, —$NHCH_3$ or —$NHC_6H_5$.

5. The color display device of claim 2, wherein the first coloring material comprises the red coloring material, and the red coloring material has a structure of the following Formula 3 or 4:

[Formula 3]

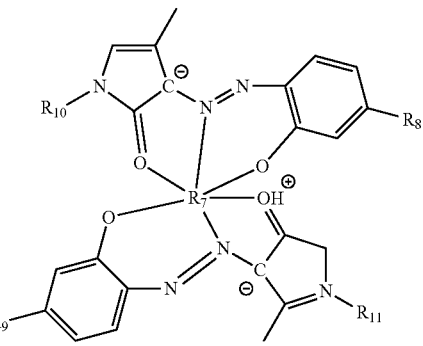

[Formula 4]

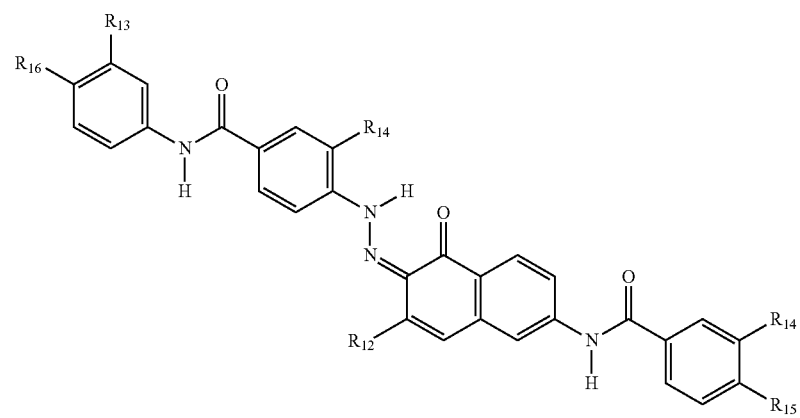

where $R_7$ is one of Cr, Mo, W, Mn, V, Nb or Ta, each of $R_8$, $R_9$, $R_{10}$ and $R_{11}$ is one of —$NO_2$, —$NH_3$, —$NHCH_3$, —$NHC_4H_9$, —$NHC_2H_5$, —NH(CnH2n+1, 3≤n≤20), or at least one aromatic group, $R_{12}$ is one of —$SO_3Na$ or —$SO_3H$, $R_{13}$ is one of —COOH or —COONa, each of $R_{14}$ and $R_{15}$ is one of —H, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, —$NHC_4H_9$, —$NHC_2H_5$, —$NHCH_3$, —$NH_2$, —NH(CnH2n+1, 3≤n≤20), or at least one aromatic group, and $R_{16}$ is one of —H, —OH, —$SO_3H$ or —COOH.

6. The color display device of claim 2, wherein the first coloring material comprises the green coloring material, and the green coloring material has a structure of the following Formula 5:

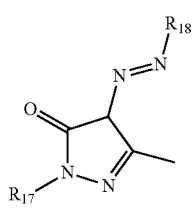

[Formula 5]

where each of $R_{17}$ and $R_{18}$ has one of the structures of the following Formulae 6 to 11:

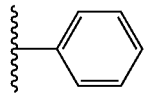

[Formula 6]

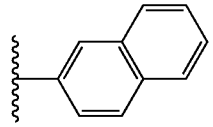

[Formula 7]

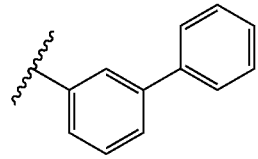

[Formula 8]

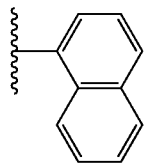

[Formula 9]

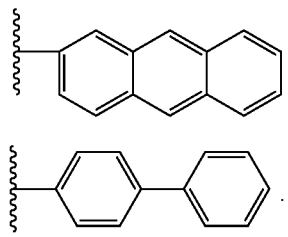

[Formula 10]

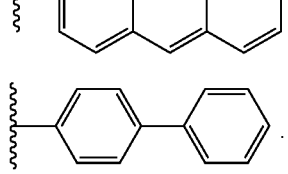

[Formula 11]

7. The color display device of claim 2, wherein the second coloring material comprises the yellow coloring material, and the yellow coloring material has a structure of the following Formula 12:

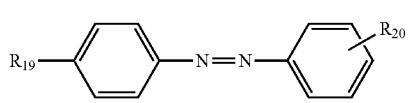

[Formula 12]

where $R_{19}$ is one of —$N(CH_3)_2$, —$N(C_2H_5)_2$, —$N(CnH2n+1, 3≤n≤20)_2$, $R_{20}$ is one of —H, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group.

8. The color display device of claim 2, wherein the second coloring material comprises the magenta coloring material, and the magenta coloring material has a structure of the following Formula 13:

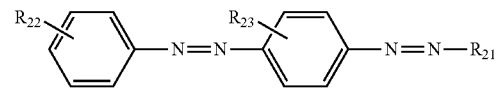

[Formula 13]

where each of $R_{22}$ and $R_{23}$ is one of —H, —$CH_3$, —$C_2H_5$, linear alkyl having 3 to 20 carbon atoms, branch alkyl having 3 to 20 carbon atoms, linear alkene having 3 to 20 carbon atoms, branch alkene having 3 to 20 carbon atoms, or at least one aromatic group, and $R_{21}$ has one of the structures of the following Formulae 14 to 25:

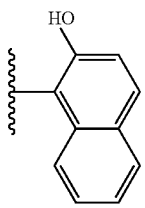

[Formula 14]

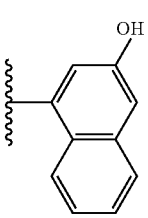

[Formula 15]

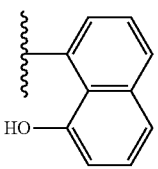

[Formula 16]

-continued

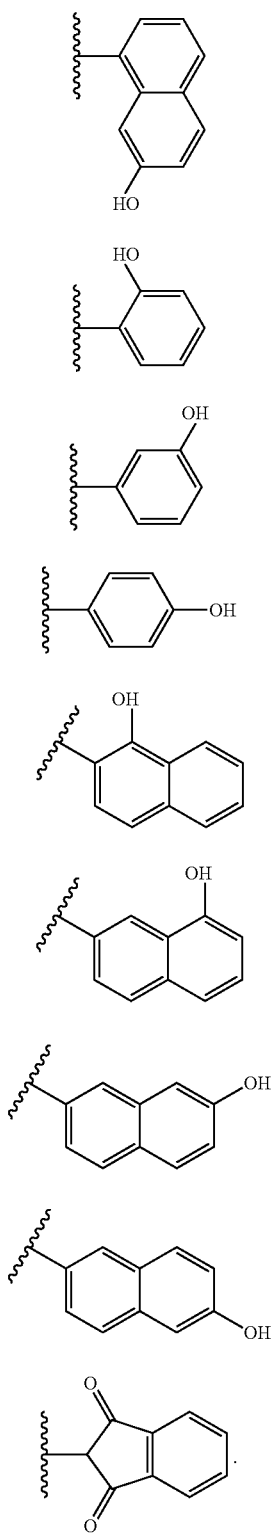

9. The color display device of claim 2, wherein the second coloring material comprises the cyan coloring material, and the cyan coloring material has a structure of the following Formula 26:

[Formula 17]

[Formula 18]

[Formula 19]

[Formula 20]

[Formula 21]

[Formula 22]

[Formula 23]

[Formula 24]

[Formula 25]

[Formula 26]

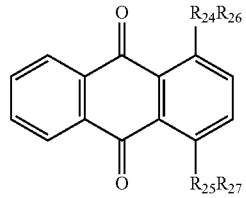

where each of $R_{24}$ and $R_{25}$ is one of O, S, Se, $CH_2$, NH or an ester, each of $R_{26}$ and $R_{27}$ is one of —H, —$CH_3$, —$C_2H_5$, —$C_3H_7$, —$C_4H_9$, —$C_5H_{11}$, linear alkyl having 6 to 20 carbon atoms, branch alkyl having 6 to 20 carbon atoms, linear alkene having 6 to 20 carbon atoms, branch alkene having 6 to 20 carbon atoms, or at least one aromatic group.

10. The color display device of claim 1, wherein an amount ratio of the second coloring material in the liquid crystals is from 0.01% to 10% by weight.

11. The color display device of claim 1, further comprising a black coloring material dispersed in the liquid crystals.

12. The color display device of claim 11, wherein the black coloring material comprises one structure of a structure obtained by connecting three naphthalene rings via two azo groups, a structure obtained by connecting two naphthalene rings and one aromatic ring via two azo groups, or a structure obtained by connecting three naphthalene rings and one aromatic ring via three azo groups.

13. The color display device of claim 11, wherein an amount of the black coloring material in the liquid crystals is from 0.01% to 10% by weight.

14. The color display device of claim 1, wherein the color display device comprises a plurality of pixel groups, and each of the pixel groups comprises the plurality of pixels,
the first coloring materials included in each of the plurality of pixels presenting the same color,
the second coloring materials included in each of the plurality of pixels presenting different colors from each other.

15. The color display device of claim 1, wherein the color display device comprises a plurality of pixel groups, and each of the pixel groups comprises the plurality of pixels,
the first coloring materials included in each of the plurality of pixels presenting different colors from each other,
the second coloring materials included in each of the plurality of pixels presenting the same color.

16. The color display device of claim 1, wherein each of the pixels further comprises:
a first transparent substrate provided on one side of the first transparent electrode;
a second transparent substrate provided on one side of the second transparent electrode; and
a reflecting layer provided on one side of the first transparent substrate,
the first transparent electrode and the second transparent electrode being provided between the first transparent substrate and the second transparent substrate, the reflecting layer being spaced apart from the first transparent electrode with the first transparent substrate therebetween.

17. The color display device of claim 1, wherein each of the pixels further comprises:
a first transparent substrate provided on one side of the first transparent electrode;

a second transparent substrate provided on one side of the second transparent electrode; and a light absorption layer provided on one side of the first transparent substrate, the first transparent electrode and the second transparent electrode being provided between the first transparent substrate and the second transparent substrate, the light absorption layer being spaced apart from the first transparent electrode with the first transparent substrate therebetween.

18. The color display device of claim 1, wherein each of the pixels comprises a light emitting device provided on one side of the first transparent electrode, and the light emitting device is spaced apart from the second transparent electrode with the first transparent electrode therebetween.

* * * * *